United States Patent [19]

Ishizuka

[11] Patent Number: 5,636,084
[45] Date of Patent: Jun. 3, 1997

[54] MAGNETIC DISK DRIVE MOTOR INCLUDING A FIXED SHAFT HAVING MOUNTED THEREON A BALL BEARING WITH A ROTOR FIXED AT ONE END THEREOF AND HAVING A DISC ABUTTING THE OUTER RING OF THE BEARING

[75] Inventor: Yutaka Ishizuka, Nagano, Japan

[73] Assignee: Kabushiki Kaisha Sankyo Seiki Seisakusho, Nagano, Japan

[21] Appl. No.: 552,171

[22] Filed: Nov. 2, 1995

Related U.S. Application Data

[63] Continuation of Ser. No. 133,876, Oct. 12, 1993, abandoned.

[30] Foreign Application Priority Data

Oct. 12, 1992 [JP] Japan .................. 4-298209

[51] Int. Cl.[6] .......................... G11B 17/028
[52] U.S. Cl. .................. 360/99.08; 360/99.12
[58] Field of Search .................. 360/99.08, 99.12, 360/98.08, 98.07; 369/263, 269, 270; 384/537, 543, 581, 584–585; 310/90

[56] References Cited

U.S. PATENT DOCUMENTS

| | | | |
|---|---|---|---|
| 4,945,432 | 7/1990 | Matsudaira et al. | 360/98.08 |
| 5,045,738 | 9/1991 | Hishida et al. | 369/269 |
| 5,047,677 | 9/1991 | Mineta et al. | 310/90 |
| 5,128,571 | 7/1992 | Itsu | 310/90 |
| 5,157,295 | 10/1992 | Stefansky et al. | 310/90 |
| 5,247,409 | 9/1993 | Sakaguchi | 360/99.08 |
| 5,274,289 | 12/1993 | Wrobel | 310/90 |
| 5,450,261 | 9/1995 | Ishizuka | 360/99.12 |

FOREIGN PATENT DOCUMENTS

| | | | |
|---|---|---|---|
| 0063859 | 1/1988 | Japan | 360/99.08 |
| 4195781 | 7/1992 | Japan | 360/98.08 |
| 4222958 | 8/1992 | Japan | 360/98.08 |

*Primary Examiner*—Stuart S. Levy
*Assistant Examiner*—Brian E. Miller
*Attorney, Agent, or Firm*—Sughrue, Mion, Zinn, Macpeak & Seas

[57] ABSTRACT

A magnetic disc drive motor contains a frame; a fixed shaft mounted on the frame; a ball bearing for rotatably supporting a magnetic disc by fitting an inner center hole of the magnetic disc on an outer ring of the ball bearing, an inner ring of the magnetic disc being secured to the fixed shaft; a rotor fixed to one end of the ball bearing, the rotor having a loading surface defined on an upper surface thereof; and a motor member including: a rotor member mounted in an inside of the rotor; and a stator member secured on the frame, wherein the inner peripheral portion of the magnetic disc fitted on the outer ring of the ball bearing is mounted on the loading surface of the rotor.

4 Claims, 3 Drawing Sheets

MAGNETIC DISK DRIVE MOTOR INCLUDING A FIXED SHAFT HAVING MOUNTED THEREON A BALL BEARING WITH A ROTOR FIXED AT ONE END THEREOF AND HAVING A DISC ABUTTING THE OUTER RING OF THE BEARING

This is a Continuation of application Ser. No. 08/133,876 filed Oct. 12, 1993 now abandoned.

BACKGROUND OF THE INVENTION

1. Field of the Invention

This invention relates to a magnetic disc drive motor, and particularly relates to a rotating support device for rotatably supporting a magnetic disc.

2. Related Art

Two examples of conventional magnetic disc motors built into hard disc drive devices are shown in FIGS. 4 and 5. In the magnetic disc drive motor shown in FIG. 4, a shaft 2 is mounted in a frame 1, and two ball bearing 3, 3 are mounted on the shaft 2. A hub 4 is mounted on the ball bearings 3, 3. The central portion of the hub 4 is cylindrical-shaped. The cylindrical central portion is open at its upper and lower ends, and two magnetic discs 5 are mounted on the outer peripheral surface of the cylindrical central portion. A seal cover 6 covers the opening at the upper end of the hub 4 and is fixed in position there by an adhesive 7.

An armature core 8 is secured on the frame 1, and a drive magnet 9 is secured on the inner surface of the cylindrical peripheral portion of the hub 4. The armature core 8 has a number of salient poles, and a coil 10 is wound around each of the salient poles. The outer surface of the armature core 8 faces the inner surface of the drive magnet 9 across a radial gap. When the armature core 8 is excited with an electric current it causes the drive magnet 9 to rotate, and the hub 4 rotates integrally with the drive magnet 9.

In the magnetic disc drive motor shown in FIG. 5, in order to make the device smaller and thinner, the motor is housed inside the hub on which the magnetic discs are loaded. A cylindrical support 12 is formed in the central part of a frame 11, and two ball bearings 13, 13 are mounted on the inner surface of this support 12. A shaft portion 15, integral with the hub 14, is rotatably mounted in the bearings 13, 13. The magnetic discs 5 are mounted on the outside of the hub 14.

An armature core 16 is mounted on the outer periphral surface of the support 12 of the frame 11, a drive magnet 17 is fixed on the inner surface of the hub 14, the armature core 16 and the drive magnet 17 and other parts make up a motor, this motor rotates the drive magnet 17 so as to rotate the hub 14 together with the drive magnet 17.

In the conventional magnetic disc drive motors described above, because they incorporate the hub 4 for carrying the magnetic discs 5, the precision of coupling hub 4 with the ball bearings 3 and the precision of machining the hub 4 directly affect the precision of the magnetic discs 5 rotation, and the precision of the magnetic discs 5 rotation is therefore impaired. Also, because the diametral thickness of the hub 4 has to be accommodated, there is the problem that it is difficult to reduce the size of the motor, and, in particular, when high density magnetic discs 5 which are both of small diameter and capable of high density recording are used, because the diameters of the shaft 2 and the ball bearings 3 have to be made small, problems such as shaft deflection occur, and the practical application of these high performance discs is difficult.

SUMMARY OF THE INVENTION

In view of the foregoing problem, an object of the present invention is to provide a magnetic disc drive motor which has a simple and compact construction and with which highly precise rotation can be achieved.

An aspect of the present invention, there is provided a magnetic disc drive motor comprising a frame; a fixed shaft mounted on the frame; a ball bearing for rotatably supporting a magnetic disc by fitting an inner center hole of the magnetic disc on an outer ring of the ball bearing, an inner ring of the magnetic disc being secured to the fixed shaft; a rotor fixed to one end of the ball bearing, the rotor having a loading surface defined on an upper surface thereof; and a motor member including: a rotor member mounted in an inside of the rotor; and a stator member secured on the frame, wherein the inner peripheral portion of the magnetic disc fitted on the outer ring of the ball bearing is mounted on the loading surface of the rotor.

According to this invention, because the magnetic discs are mounted with their inner edges fitted in direct contact with the outer rings of the ball bearings and with their inner edge portions loaded on the loading surface of the rotor, the magnetic discs can be rotated with a high degree of precision on high precision ball bearings without being affected by the precision of the fit between any hub and the ball bearings or the precision with which any hub is machined, and the realization of high capacity disc drives is therefore made easy.

Furthermore, because the hub is dispensed with and a diametrally thick hub is no longer interposed between the bearings and the magnetic discs, magnetic discs having small center holes can be used, and when magnetic discs having regular sized center holes are used, the diameter of the fixed shaft can be increased and therefore the strength and vibration resistance of the shaft can be increased. And, because the high precision and expensive hub that has conventionally been necessary is no longer needed, the cost of the hub can be reduced, the size of the device can be reduced by an amount corresponding to the thickness of the hub, and the motor can therefore easily be made smaller.

DETAILED DESCRIPTION OF THE PREFERRED EMBODIMENTS

A first preferred embodiment of a magnetic disc drive motor according to the present invention will now be described, with reference to the accompanying drawings.

Figure 1:
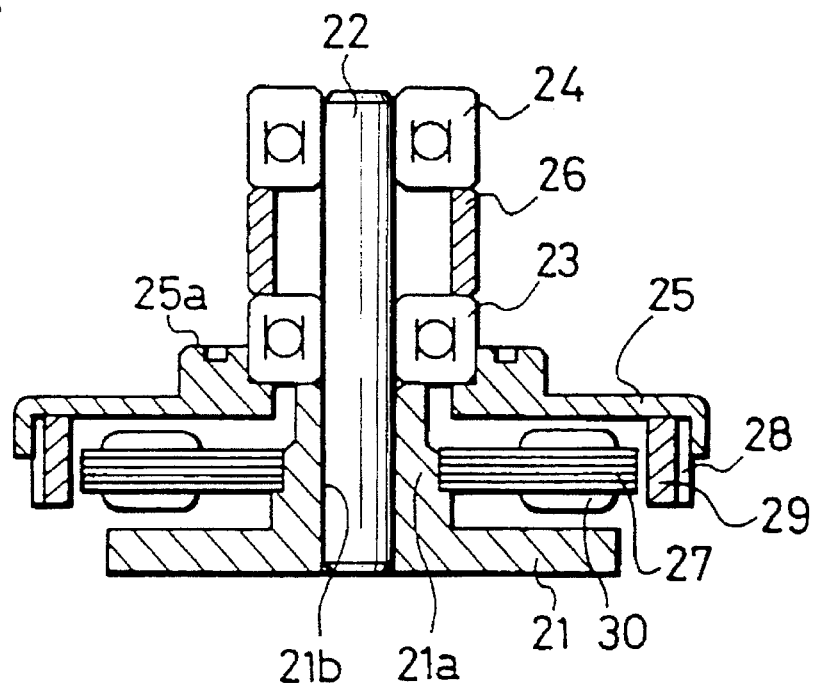
FIG. 1 is a cross-sectional view of a magnetic disc drive motor constructed according to a first preferred embodiment of the present invention.

In FIG. 1, a boss portion 21a projects up from the central portion of a frame 21, and a cylindrical fixed shaft 22 is mounted vertically in an axial center hole 21b formed in the boss portion 21a. This fixed shaft 22 does not have to be a separate member from the frame 21, as it is in FIG. 1, and can instead be formed as an integral part of the frame 21, projecting vertically upward from the central portion of the frame 21. The inner rings of an upper ball bearing 24 and a lower ball bearing 23 are fitted on the fixed shaft 22, respectively. The inner ring of the lower ball bearing 23 is brought into contact with the upper end surface of the boss portion 21a, the central portion of a generally plate-shaped rotor 25 is mounted on the lower side of the outer ring of this lower ball bearing 23, and the rotor 25 is thereby rotatably supported on the fixed shaft 22 by the lower bearing 23. This rotor 25 is provided with a loading surface 25a formed in a plane perpendicular to the fixed shaft 22.

A collar 26 is held between the outer rings of the lower and upper ball bearings 23 and 24. When the inner rings of the upper and lower ball bearings are being fitted onto the fixed shaft 22, the inner rings are fixed to the shaft 22 with adhesive or the like while a suitable downward pressure is applied to the inner ring of the upper ball bearing 24, with the collar 26 in position between the outer rings of the two bearings. In this way, the ball bearings 23 and 24 are both provided with a pre-load.

An armature core 27 is mounted on a step portion formed in the outer surface of the boss portion 21a of the frame 21; this armature core 27 has a number of salient poles on its outer side, and a coil 30 is wound around each of the salient poles; the armature core 27 and the coils 30 make up a stator section. A drive magnet 29 is mounted on the inner surface of the cylindrical peripheral portion of the rotor 25 through a back yoke 28 consisting of a magnetic body such as a steel plate; the back yoke 28 and the drive magnet 29 make up a rotor section. The outer surface of the armature core 27 and the inner surface of the drive magnet 29 face each other across a fixed radial gap. The stator section, made up of the armature core 27 and the coils 30, and the rotor section, made up of the drive magnet 29 and the back yoke 28, together make up a motor section; this motor section rotates the drive magnet 29, and the rotor 25 and the outer rings of the ball bearings 23 and 24 rotate together with the drive magnet 29.

Figure 2:
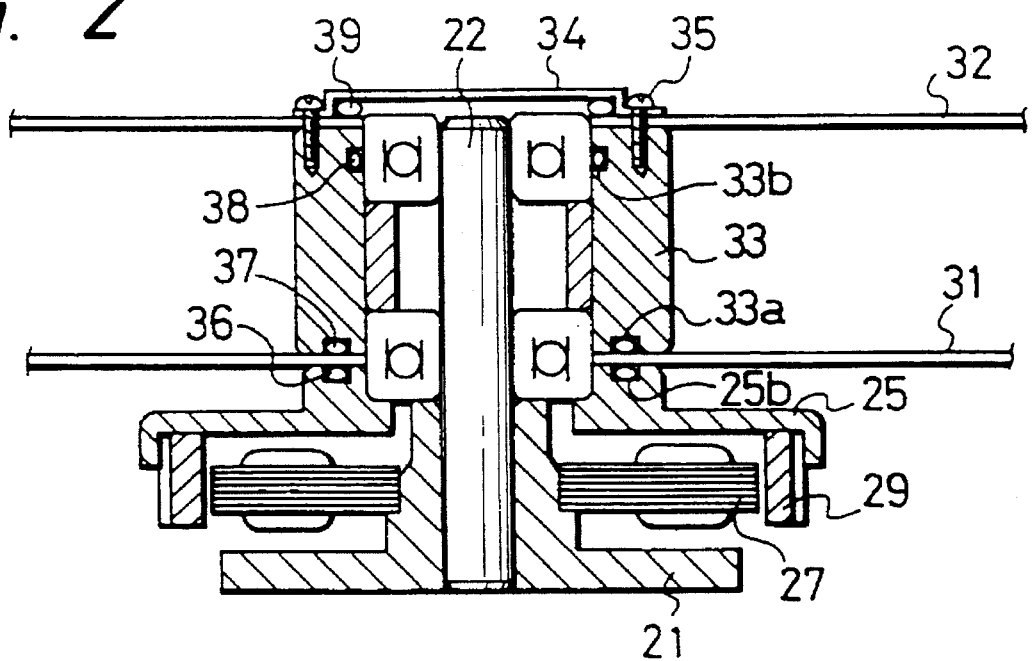
FIG. 2 is a cross-sectional view of the magnetic disc drive motor of FIG. 1 loaded with magnetic discs.

As shown in FIG. 2, inner holes of magnetic discs 31 and 32 are fitted on the outer rings of the ball bearings 23 and 24, respectively. The magnetic disc 31 is fitted on the ball bearing 23 and the inner peripheral portion of the magnetic disc 23 is positioned on the loading surface 25a. A disc spacer 33 is positioned on the upper surface of the magnetic disc 31, and the magnetic disc 32, fitted on the outer ring of the ball bearing 24, is mounted on top of the disc spacer 33. A disc clamper 34 is mounted on top of the magnetic disc 32, and the disc clamper and the magnetic disc 32 are both fixed to the disc spacer 33 by screws 35.

A circular groove 25b of rectangular cross-section is provided in the loading surface 25a of the rotor 25, and an O-ring 36 is fitted in this circular groove 25b. Similarly, a circular groove 33a is formed in the lower surface of the disc spacer 33, facing the circular groove 25b, another circular groove 33b is formed in the inner surface of the disc spacer 33, facing the outer ring of the ball bearing 24, and O-rings 37 and 38 are fitted in these circular grooves 33a and 33b, respectively. Also, another O-ring 39 is provided between the disc clamper 34 and the magnetic disc 32. These O-rings all function as sealing means.

In loading the magnetic discs 31 and 32 onto the device, first the magnetic disc 31 is fitted over the ball bearing 23 and positioned on the loading surface 25a of the rotor 25. Then the disc spacer 33 is fitted into place and, with the O-rings 36, 37, and 38 compressed, fixed with adhesive or the like to the outer rings of the ball bearings 23 and 24. Then the O-ring 39 is positioned on the upper surface of the magnetic disc 32, the disc clamper 34 is positioned on top of the O-ring 39, and the screws 35 are screwed into the disc spacer 33, compressing the O-ring 39 and holding it in place between the magnetic disc 32 and the disc clamper 34. Positioning the O-rings 36–39 in this way results in the space in which the ball bearings 23 and 24 are mounted being sealed off from the outside, and consequently any oil mist or the like that might be sprayed out from the ball bearings 23 and 24 is prevented from getting out onto the recording surfaces of the magnetic discs 31 and 32. These O-rings can be dispensed with when the ball bearings 23 and 24 produce negligible quantities of dust or are themselves well sealed.

Figure 3:
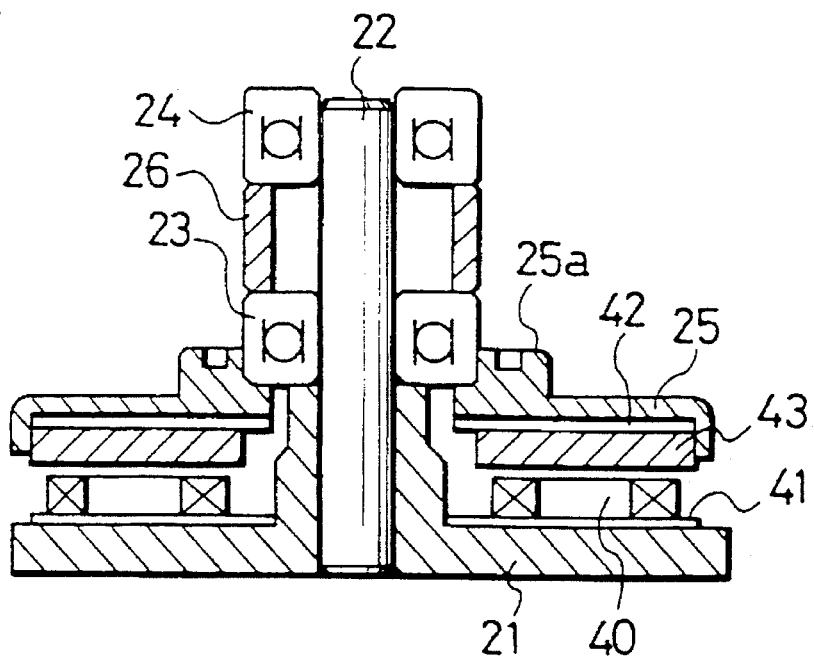
FIG. 3 is a cross-sectional view of a second preferred embodiment.
Figure 4:
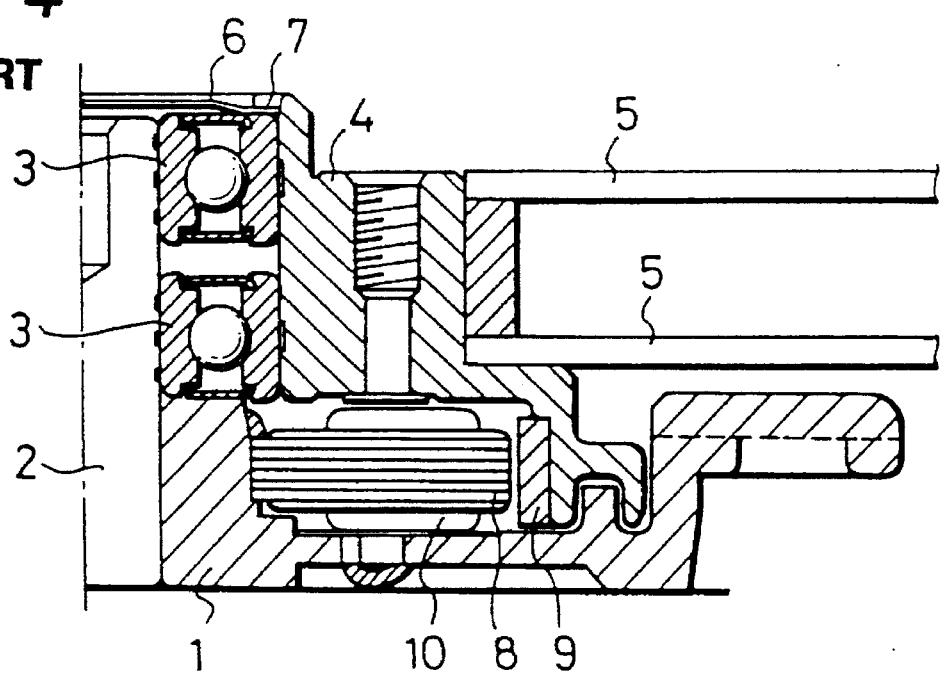
FIG. 4 is a cross-sectional view of a conventional magnetic disc drive motor.
Figure 5:
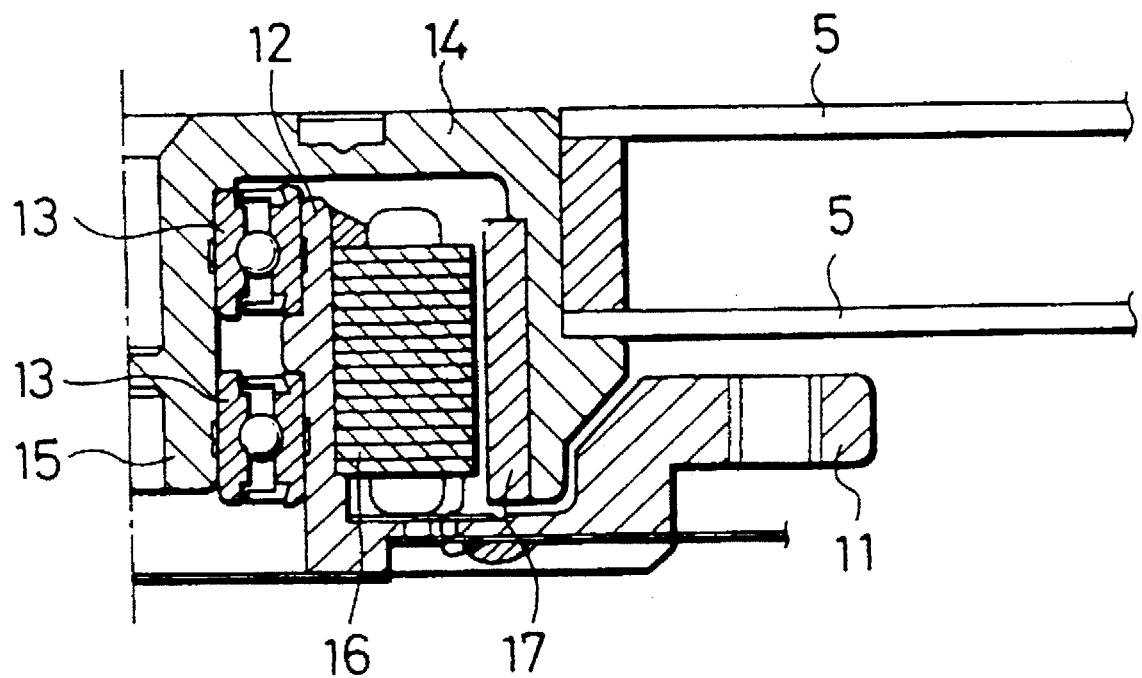
FIG. 5 is a cross-sectional view of another conventional magnetic disc drive motor.

A second preferred embodiment of a magnetic disc drive motor according to the present invention is shown in FIG. 3. In this second preferred embodiment, the motor section is constructed in such a way that the gap exists between the rotor magnet and the stator magnet in axial direction thereof. A stator section is made up of a number of armature coils 40, divided into for example three phases, mounted on a stator base 41 mounted on a flat surface on the frame 21. A donut-shaped drive magnet 43 is fixed on a inner side of the rotor 25 through a back yoke 42 made of magnetic body for example iron plate or the like, and these are formed to the rotor section. The drive magnet 43 and the armature coils 40 face each other across an axial gap, and when the armature coils 40 are excited by an electric current they rotate the drive magnet 43. The rotor 25 and the outer rings of the ball bearings 23 and 24 rotate integrally with the drive magnet 43. Apart from the motor section described above, this second preferred embodiment is identical in construction to the first preferred embodiment, and therefore a description here of the other details of the construction of the second preferred embodiment will be omitted.

It should be noted that various changes can be made to the constructions described above without exceeding the scope of the present invention. For example, although the first and second embodiments described above were each loaded with two magnetic discs, a single magnetic disc can alternatively be used. And, when a single disc is used, a single ball bearing can be used instead of two.

As is clear from the above description, with a magnetic disc drive motor according to this invention, because the magnetic discs are mounted with their inner edges fitted in direct contact with the outer rings of the ball bearings and with their inner edge portions loaded on the loading surface of the rotor, the magnetic discs can be rotated with a high degree of precision on high precision ball bearings without being affected by the precision of the fit between any hub and the ball bearings or the precision with which any hub is machined, and the realization of high capacity disc drives is therefore made easy.

Furthermore, because the hub is dispensed with and a diametrally thick hub is no longer interposed between the bearings and the magnetic discs, magnetic discs having small center holes can be used, and when magnetic discs having regular sized center holes are used the diameter of the fixed shaft can be increased and therefore the strength and vibration resistance of the shaft can be increased. And, because the high precision and expensive hub that has conventionally been necessary is no longer needed, the cost of the hub can be reduced, the size of the device can be reduced by an amount corresponding to the thickness of the hub, and the motor can therefore easily be made smaller.

What is claimed is:

1. A magnetic disc drive motor, comprising:

a frame;

a fixed shaft having a lower shaft portion fixedly mounted on the frame and an upper shaft portion and defining a fixed axis;

a ball bearing member for rotatably supporting a magnetic disc thereon, said ball bearing member including an upper and a lower ball bearing each of which has an inner ring being secured to the upper shaft portion of the fixed shaft and an outer ring for receiving a magnetic disc;

a collar held between the outer rings of the upper and lower ball bearings mounted on the fixed shaft;

a rotor, for mounting the magnetic disc, fixed to a lower end portion of the outer ring of the lower ball bearing, the rotor having a loading surface defined on an uppermost surface thereof, said loading surface being perpendicular with respect to the fixed axis of said fixed shaft; and a motor member including:
 a rotor member mounted in an inside of the rotor; and
 a stator member secured on the frame, wherein the upper shaft portion protrudes above the uppermost surface of the rotor such that the upper ball bearing, the collar, and at least an upper portion of the lower ball bearing are positioned above the uppermost surface of the rotor, and wherein an inner edge portion of the magnetic disc abuts the outer ring of at least one of the upper and lower ball bearings, and an inner peripheral portion of the magnetic disc is mounted on the loading surface of the rotor.

2. A magnetic disc drive motor as claimed in claim 1, wherein the rotor is plate-shaped so as to define an inner surface, and further comprising an armature core fixed to the frame, a drive magnet fixed to the inner surface of the rotor, and wherein an inner surface of the drive magnet and the outer surface of the armature core face each other.

3. A magnetic disc drive motor as claimed in claim 1, wherein the rotor is plate-shaped so as to define an inner surface, and further comprising a stator base with a plurality of armature coils mounted thereon and which is fixed to the frame, a drive magnet which is fixed to the inner surface of the rotor, and wherein the drive magnet and the armature coils face each other with an axial predetermined gap.

4. A magnetic disc drive device as claimed in claim 1, further comprising:

an annular groove formed in the loading surface of the rotor;

a first sealing member disposed in said annular groove formed in the loading surface of the rotor;

a disc clamper for clamping the magnetic disc; and a second sealing member disposed on said disc clamper.

* * * * *